(12) United States Patent
Yang et al.

(10) Patent No.: US 12,676,335 B2
(45) Date of Patent: Jul. 7, 2026

(54) BATTERY PRESSURIZING DEVICE

(71) Applicant: CONTEMPORARY AMPEREX TECHNOLOGY CO., LIMITED, Ningde (CN)

(72) Inventors: Weixu Yang, Ningde (CN); Leigang Qiu, Ningde (CN); Bingchao Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 294 days.

(21) Appl. No.: 18/523,921

(22) Filed: Nov. 30, 2023

(65) Prior Publication Data

US 2025/0006977 A1 Jan. 2, 2025

Related U.S. Application Data

(63) Continuation of application No. PCT/CN2023/102733, filed on Jun. 27, 2023.

(51) Int. Cl.
*H01M 10/04* (2006.01)
*B30B 3/00* (2006.01)
*B30B 3/02* (2006.01)

(52) U.S. Cl.
CPC ........... *H01M 10/0481* (2013.01); *B30B 3/00* (2013.01); *B30B 3/02* (2013.01); *H01M 10/0404* (2013.01)

(58) Field of Classification Search
CPC .. B30B 7/04; B30B 15/26; B30B 3/00; B30B 3/02; H01M 10/04; H01M 10/0404; H01M 10/0468; H01M 10/0481; H01M 50/204; Y02E 60/10; Y02P 70/50
See application file for complete search history.

(56) References Cited

U.S. PATENT DOCUMENTS

| | | | | |
|---|---|---|---|---|
| 2014/0251166 A1* | 9/2014 | Babiel | ..................... | B30B 1/261 100/137 |
| 2023/0132631 A1* | 5/2023 | Wiegman | .......... | H01M 10/0481 29/623.1 |
| 2023/0178789 A1 | 6/2023 | Wang | | |

FOREIGN PATENT DOCUMENTS

| | | |
|---|---|---|
| CN | 108262374 A | 7/2018 |
| CN | 111129569 A | 5/2020 |
| CN | 113054260 A | 6/2021 |
| CN | 216161777 U | 4/2022 |
| CN | 216178169 U | 4/2022 |
| CN | 116190754 A | 5/2023 |

(Continued)

OTHER PUBLICATIONS

English translation of CN-111129569 A—10 pages—retrieved in Nov. 2025. (Year: 2025).*

(Continued)

*Primary Examiner* — Jimmy T Nguyen

(74) *Attorney, Agent, or Firm* — XSENSUS LLP

(57) ABSTRACT

A battery pressurizing device includes a carrying mechanism for carrying a battery; and a pressurizing mechanism movable relative to the carrying mechanism, wherein the pressurizing mechanism includes a mounting member and a pressurizing member, the pressurizing member is arranged on the mounting member and is rotatable relative to the mounting member, the pressurizing member is configured to abut against the battery along a first direction to apply pressure on the battery.

17 Claims, 6 Drawing Sheets

(56) References Cited

FOREIGN PATENT DOCUMENTS

KR      20180056131 A      5/2018

OTHER PUBLICATIONS

English translation of CN-113054260 A, 11 pages, retrieved in Nov. 2025. (Year: 2025).*
English translation of KR-20180056131 A, 6 pages, retrieved in Nov. 2025 (Year: 2025).*
International Search Report issued Feb. 18, 2024 in International Patent Application No. PCT/CN2023/102733 with English translation thereof.
Extended European Search Report issued Dec. 10, 2024 in European Patent Application No. 23806151.9.

* cited by examiner

BATTERY PRESSURIZING DEVICE

CROSS-REFERENCE TO RELATED APPLICATION

This application is a Continuation of International Application No. PCT/CN2023/102733, filed on Jun. 27, 2023, which is incorporated herein by reference in its entirety.

TECHNICAL FIELD

The present application relates to the field of battery production, and more particularly to a battery pressurizing device.

BACKGROUND ART

In the production and assembly process of power batteries for new energy vehicles, batteries need to be assembled under specific pressure. In the case of pressurizing the battery in one direction to make the battery have a specified size, there is a problem that the surfaces of the battery in other directions may be deformed undesirably, making it difficult to achieve the desired flatness.

The prior art provides a universal module pressurizing device, which includes a workbench, a pressurizing component, a pressure transmitting component and a pressure bearing component. During operation, the pressurizing component applies pressure in one direction to the battery to be pressurized interposed between the pressure transmitting component and the pressure bearing component through the pressure transmitting component, thereby compressing the battery in the one direction.

SUMMARY OF THE DISCLOSURE

One of the objectives of the embodiments of the present application is to provide a battery pressurizing device so as to alleviate the problem of poor compression effect in the process of pressurizing the battery.

In order to solve the above technical problems, the following technical solutions are adopted in the embodiments of the present application.

In a first aspect, a battery pressurizing device is provided, the battery pressurizing device comprising: a carrying mechanism for carrying a battery; and a pressurizing mechanism movable relative to the carrying mechanism, wherein the pressurizing mechanism includes a mounting member and a pressurizing member, the pressurizing member is arranged on the mounting member and is rotatable relative to the mounting member, the pressurizing member is configured to abut against the battery along a first direction to apply pressure on the battery.

The pressurizing member of the pressurizing mechanism is rotatable relative to the mounting member, so that the pressurizing member rollably abuts against the battery along the first direction D1 and pressurizes the battery. Thus, even if the surface of the battery to be flattened is uneven, the surface of the battery can be flattened without damaging the surface of the battery while maintaining a consistent pressurizing pressure.

In some embodiments of the present application, the pressurizing member includes at least one roller, and the rotation plane of the roller is parallel to the abutting direction of the pressurizing member abutting against the battery.

The rotation plane is parallel to the abutting direction, so that the contact between the pressurizing member and the battery can be line abutment or even point abutment, thus the friction generated between the pressurizing member and the battery is rolling friction, which enables better compatibility with different degrees of protrusion of the battery surface and reduces the risk of battery damage.

In some embodiments of the present application, at least part of the outer peripheral surface of the roller is arc-shaped.

The at least partially arc-shaped outer peripheral surface of the roller facilitates line contact or even point abutment between the roller and the battery.

In some embodiments of the present application, the surface of the pressurizing member is made of an elastic insulating material.

The elasticity of the elastic insulating material can avoid damage to the battery, and the insulativity can avoid causing the battery to conduct electricity.

In some embodiments of the present application, the pressurizing mechanism includes a pressurizing assembly, the pressurizing assembly includes a plurality of pressurizing members arranged side by side along a second direction, the pressurizing assembly is mounted on the mounting member, and the second direction is perpendicular to the first direction.

The side-by-side arrangement of a plurality of pressurizing members along the second direction facilitates the formation of a plurality of line contact segments spaced apart on the entire surface of the battery to be flattened at least in the second direction, thereby enabling better compatibility with different degrees of protrusion of the battery surface and reducing the risk of battery damage.

In some embodiments of the present application, the pressurizing mechanism includes a plurality of pressurizing assemblies arranged at intervals along a third direction, and the third direction is perpendicular to the first direction and the second direction.

The pressurizing assembly thus constructed facilitates the formation of more line contact segments spaced apart in both the second direction and the third direction, which enables better compatibility with different degrees of protrusion of the battery surface and reduces the risk of battery damage.

In some embodiments of the present application, two adjacent pressurizing members in the pressurizing assembly are staggered along a third direction, the third direction being perpendicular to the first direction and the second direction.

The line contact segments formed by the abutment of the pressurizing members in the pressurizing assembly against the battery are arranged more closely in the second direction, and are discontinuous in the third direction, that is, a plurality of line contact segments that are denser and staggered are formed in the third direction, which enables better compatibility with different degrees of protrusion on the battery surface and reduces the risk of battery damage.

In some embodiments of the present application, the projections of two adjacent pressurizing members along the third direction at least partially overlapped.

The pressurizing assembly thus constructed can form a plurality of line contact segments that are denser in the second direction, which enables better compatibility with different degrees of protrusion of the battery surface and reduces the risk of battery damage.

In some embodiments of the present application, the mounting member includes a first mounting sub-member and a plurality of second mounting sub-members, the plurality of second mounting sub-members are mounted on one side of the first mounting sub-member along the first direction, and the pressurizing member is rotatably connected to the second mounting sub-members.

The mounting member thus constructed provides in a simple manner a plurality of pressurizing members which can rotatably abut against the battery.

In some embodiments of the present application, the pressurizing mechanism further includes an elastic member, and the elastic member is arranged between the first mounting sub-member and the second mounting sub-member.

The arrangement of the elastic member can enable compatibility with battery surfaces with different degrees of protrusion. Taking battery terminals with height differences as an example, the elastic members arranged independently of each other make each elastic member adapt to the corresponding heights of the battery terminals so that they can be compressed with different compression when all the battery terminals are pressurized at the same time, so that the pressurizing pressure can be kept consistent and the flatness of the electrode terminals can be ensured.

In some embodiments of the present application, the pressurizing mechanism further includes a connecting rod, the connecting rod is used to connect the first mounting sub-member and the second mounting sub-member, and the elastic member is sleeved on the connecting rod.

Separate elastic members are provided in a simple manner, so that the pressurizing members are independently compatible with battery surfaces with different degrees of protrusion.

In some embodiments of the present application, the second mounting sub-member is connected with the plurality of pressurizing members.

The connection of the plurality of pressurizing members with the second mounting sub-member makes it possible to provide closer and shortened line contact segments in the second direction and the third direction in a simple manner.

In some embodiments of the present application, the second mounting sub-member includes a main body and at least a pair of lugs extending from the main body in the first direction. Each pair of lugs are spaced apart and arranged in parallel along the second direction, so that each pressurizing member is rotatably mounted in each pair of lugs by means of a pivot member.

The second mounting sub-member thus constructed enables the plurality of pressurizing members to provide more line contact segments that are closer and shortened in length in the second direction and the third direction, which enables better compatibility with different degrees of protrusion of the battery surface and reduces the risk of battery damage.

In some embodiments of the present application, the spacing between the plurality of pressurizing assemblies in the third direction is adjustable through a spacing-changing mechanism connected to the first mounting member.

The arrangement of the spacing-changing mechanism makes the spacing of the plurality of pressurizing assemblies flexible and adjustable in the third direction, so as to be compatible with batteries of different widths and realize quick replacement.

In some embodiments of the present application, the spacing-changing mechanism includes a bidirectional adjusting screw.

The arrangement of the bidirectional adjusting screw provides linear movement of at least one of the plurality of first mounting members relative to each other, thereby facilitating the adjustment of the spacing of the plurality of pressurizing assemblies in the third direction.

In some embodiments of the present application, the battery pressurizing device further includes a fixing member, the plurality of first mounting sub-members are slidably connected to the fixing member along the third direction, and the third direction is perpendicular to the first direction and the second direction.

The slidable connection between the fixing member and the first mounting sub-member along the third direction facilitates providing sufficient support and smooth sliding, and facilitates the spacing-changing mechanism to more smoothly adjust the spacing between the plurality of pressurizing assemblies in the third direction.

In some embodiments of the present application, the battery pressurizing device further includes a driving mechanism and a position-limiting member, the driving mechanism is used to drive the pressurizing mechanism to move along the first direction, and the position-limiting member is used to limit the stroke of the driving mechanism.

The distance of the position-limiting member relative to the reference plane corresponds to the stroke of the driving mechanism. When the position-limiting member reaches the reference plane, the driving mechanism reaches the stroke and stops driving, so that a predetermined amount of pressure can be applied to the battery.

In some embodiments of the present application, the battery pressurizing device further includes a sensor, and the sensor is used to detect whether the driving mechanism reaches the stroke.

The sensor monitors the stroke of the driving mechanism in real time to ensure that the driving of the driving mechanism is stopped once the driving mechanism reaches the stroke, so that the battery can obtain the desired predetermined amount of pressure.

In some embodiments of the present application, the battery pressurizing device further includes a motion buffer, and the motion buffer is used to buffer the movement of the position-limiting member when the driving mechanism reaches the stroke.

The motion buffer buffers the movement of the position-limiting member along the first direction, so as to buffer the motion of the pressurizing member driven by the driving mechanism to prevent the impact caused by the motion from damaging the surface of the battery.

In some embodiments of the present application, the battery pressurizing device further includes a shaping mechanism, the shaping mechanism is used to apply pressure to the battery, and the direction in which the shaping mechanism pressurizes the battery is perpendicular to the first direction.

Thus, the battery pressurizing device can pressurize the battery in at least two directions, so as to obtain a flat and effectively compressed battery.

DESCRIPTION OF DRAWINGS

These and other advantages and benefits of the present application will become apparent to those of ordinary skill in the art upon reading the following detailed description of the preferred embodiments. The drawings are for the purpose of illustrating the preferred embodiments only and are not to be considered a limitation to the present application. Also, the same components are denoted by the same reference numerals in all the drawings. In the drawings.

Figure 1:
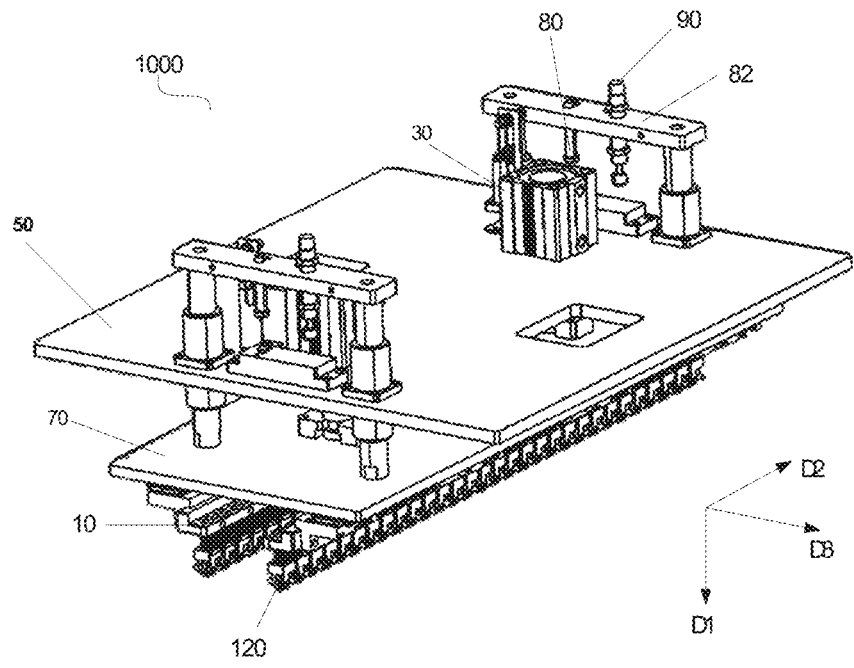
FIG. 1 schematically illustrates a perspective view of a battery pressurizing device according to one or more embodiments.

Reference numerals in Detailed Description are as follows:

1000 battery pressurizing device; 10 pressurizing mechanism; 200 first shaping mechanism; 300 second shaping mechanism; 400 battery; 500 carrying mechanism;
110 mounting member; 112 first mounting member; 114 second mounting member; 1141 main body; 1142 lug; 1143 pivot member; 1144 washer;
120 pressuring member; 1200 pressurizing assembly; 130 elastic member; 140 connecting rod; 1401 sleeve; 160 fixing member; 170 sliding block;
30 driving mechanism; 32 fixed first driving member; 34 movable second driving member; 36 sensor; 40 distancing-changing mechanism; 42 bidirectional adjusting screw; 50 fixed mounting member; 70 movable mounting member; 80 position-limiting member; 82 top member; 90 motion buffer;
D1 first direction; D2 second direction; D3 third direction.

DETAILED DESCRIPTION

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations; A exists alone, both A and B exist, and B exists alone.

In the description of the embodiments of the present application, the term "a plurality of" refers to two or more (including two), and similarly, "a plurality of groups" refers to two or more (including two) groups.

In the description of the embodiments of the present application, the orientation or position relationship indicated by the technical terms "center", "longitudinal", "transverse", "length", "width", "thickness", "upper", "lower", "vertical", "horizontal", "top", "bottom", etc. are based on the orientation or position relationship shown in the drawings and are intended to facilitate the description of the embodiments of the present application and simplify the description only, rather than indicating or implying that the device or element referred to must have a particular orientation or be configured and operated in a particular orientation, and therefore are not to be interpreted as limitations on the embodiments of the present application.

In the description of the embodiments of the present application, unless otherwise expressly specified and limited, the technical terms "mount", "join", "connect", "fix", etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

The battery described herein is a battery module including a plurality of battery cells arranged in a longitudinal direction, each battery cell having two battery terminals. It should be understood, however, that the battery described herein is not limited to the battery module, but may include a battery cell or a battery pack, and therefore, the battery pressurizing device in the present application is not limited to pressurizing the battery module, but may also be used to pressurize the battery cell or the battery pack.

At present, from the perspective of the development of the market situation, power batteries are more and more widely used. The power batteries are used in energy storage power source systems such as hydraulic, thermal, wind and solar power stations as well as in electric vehicles such as electric bicycles, electric motorcycles and electric cars, and military equipment and aerospace fields. With the continuous expansion of the application field of the power batteries, the market demand is also constantly expanding.

In the process of grouping power batteries, it is inseparable from the pressurized assembly of the batteries. At present, there are various module pressurizing devices that are individually designed for different batteries. Although they can meet the production requirements, the capital investment is relatively large, and a large number of corresponding jigs and fixtures are required on the production site. For different types of batteries, the pressurizing device needs to replace some parts to be suitable, and the cost of the replacement is high.

If the surface of the pressurizing member of the pressurizing mechanism abutting against the battery is configured as a flat plane, when flattening the battery, since the degrees of protrusion of the battery surface to be flattened are not the same, the pressurizing pressure cannot be kept consistent when pressurizing the whole battery surface, and the flatness of the battery cannot be guaranteed. In addition, since the abutment between the flat plane and the surface of the battery is plane contact, the friction caused by pressurizing the battery in at least another direction is sliding friction, which increases the risk of damage to the battery compared to rolling friction.

In order to solve the above problems, the present application conceives that the pressurizing mechanism is designed to include a rotatable pressurizing member, so that the pressurizing member can rollably abut against the battery and apply pressure to the battery. In this way, the abutment between the pressurizing member and the battery will be changed from plane contact to line contact and even point contact. In other words, plane contact can be changed into more discrete line contact segments. Herein, the line contact segment means that the abutment between the pressurizing member and the battery is segmented line contact. The large number of the line contact segments, the staggered and scattered arrangement relative to each other and the short length of the segments can better accommodate different degrees of protrusion of the battery surface. In addition, the friction between the pressurizing member and the battery will be changed from sliding friction to rolling friction, thereby reducing the risk of battery damage.

The battery pressurizing device disclosed in the embodiments of the present application can pressurize any surface of the battery to be flattened, so as to adjust the unflatness without damaging the battery.

For the following embodiments, for convenience of description, a battery pressurizing device 1000 according to one or more embodiments of the present application flattens the surface of battery terminals of a battery as an example for description.

Referring to FIGS. 1 to 4, they schematically show a perspective view, a front view, a side view and a bottom perspective view of a battery pressurizing device according to one or more embodiments of the present application, respectively. FIGS. 5A and 5B schematically illustrate battery pressurizing device shown in FIG. 1 in a rest position and in an abutting pressurizing position during operation, respectively in one or more exemplary applications. It is only schematically shown in FIGS. 5A and 5B that there may be a first shaping mechanism 200 and/or a second shaping mechanism 300 during operation, but it does not mean that they necessarily exist.

According to one or more embodiments, referring to FIGS. 1 to 5B, the battery pressurizing device 1000 includes: a carrying mechanism 500 for carrying a battery 400; and a pressurizing mechanism 10 movable relative to the carrying mechanism 500. The pressurizing mechanism 10 includes a mounting member 110 and a pressurizing member 120. The pressurizing member 120 is arranged on the mounting member 110 and is rotatable relative to the mounting member. The pressurizing member 120 is used to abut against the battery 400 along a first direction D1 to apply pressure on the battery.

In FIGS. 1 to 5B, herein, the first direction is the direction indicated by arrow D1 and the second direction is the direction indicated by arrow D2. The battery 400 refers to a battery module including two rows of a plurality of battery cells arranged along the second direction D2, each battery cell having two battery terminals, wherein the anodes of the battery terminals of one row of battery cells face upward, and the cathodes of the battery terminals of the other row of battery cells face upward. The carrying mechanism 500 refers to any structure that can be used to carry the battery 400, such as a platform or a holder. The pressurizing mechanism 10 refers to a mechanism for abutting against and pressurizing the battery 400. Herein, the first direction D1 refers to a direction in which the pressurizing mechanism 10 moves toward the battery 400 to abut against the battery, as indicated by the arrow D1. In other words, the first direction D1 refers to a direction perpendicular to and toward the surface of the battery to be flattened. Hereinafter, the surface of the battery to be flattened refers to the entire surface of the battery to be abutted against and pressurized by the pressurizing member 120. As schematically shown in FIGS. 5A and 5B, the surface of the battery to be flattened is exemplified by the surface of the battery where the electrode terminals are located.

The pressurizing member 120 of the pressurizing mechanism 10 is rotatable relative to the mounting member 110, so that the pressurizing member 120 rollably abuts against the battery 400 and pressurizes the battery 400 along the first direction D1. Thus, even if the surface of the battery to be flattened is uneven, the surface of the battery can be flattened without damaging the surface of the battery (such as electrode terminals) while maintaining a consistent pressurizing pressure.

According to one or more embodiments, the pressurizing member 120 includes at least one roller, and the rotation plane of the roller is parallel to the abutting direction of the pressurizing member 120 abutting against the battery 400.

A roller is a component capable of at least partial rotational movement about its axis. Herein, the rotation plane of the roller is the plane formed by the first direction D1 and the third direction D3. The abutting direction of the pressurizing member abutting against the battery refers to the direction along which the roller abuts against the battery, that is, the first direction D1. Therefore, the rotation plane is parallel to the abutting direction.

The rotation plane is parallel to the abutting direction, so that the pressurizing member 120 can rollably abut against the battery 400, and the contact therebetween is line abutment and even point abutment, thus the friction generated between the pressurizing member and the battery is rolling friction, which enables better compatibility with different degrees of protrusion of the battery surface and reduces the risk of battery damage.

According to one or more embodiments, the outer peripheral surface of the roller is at least partially arc-shaped.

The outer peripheral surface of the roller can be a complete arc or a part of an arc. Optionally, the outer peripheral surface of the roller may be any arc capable of achieving line contact with the battery.

The outer peripheral surface of the roller is at least partially arc-shaped, which helps to realize the line contact or even point abutment between the roller and the battery, so that the friction generated between the pressurizing member and the battery is rolling friction, which enables better compatibility with different degrees of protrusion of the battery surface and reduces the risk of battery damage.

According to one or more embodiments, the surface of the pressurizing member 120 is made of an elastic insulating material.

The pressurizing member 120 can be integrally made of an elastic insulating material. Alternatively, the outer periphery of the pressurizing member 120 may be wrapped with an elastic insulating material. The elastic insulating material may be a non-metallic material with a Shore hardness of 65-80, which is suitable for forming a line contact between the pressurizing member and the battery. Optionally, the elastic insulating material may be a non-metallic material with a Shore hardness of 70.

The elasticity of the elastic insulating material can avoid damage to the battery, and the insulativity can avoid causing the battery to conduct electricity.

According to one or more embodiments, the pressurizing mechanism 10 includes a pressurizing assembly 1200, the pressurizing assembly includes a plurality of pressurizing members 120 arranged side by side along the second direction D2, the pressurizing assembly 120 is mounted on mounting member 110, the second direction D2 is perpendicular to the first direction D1.

Figure 6:
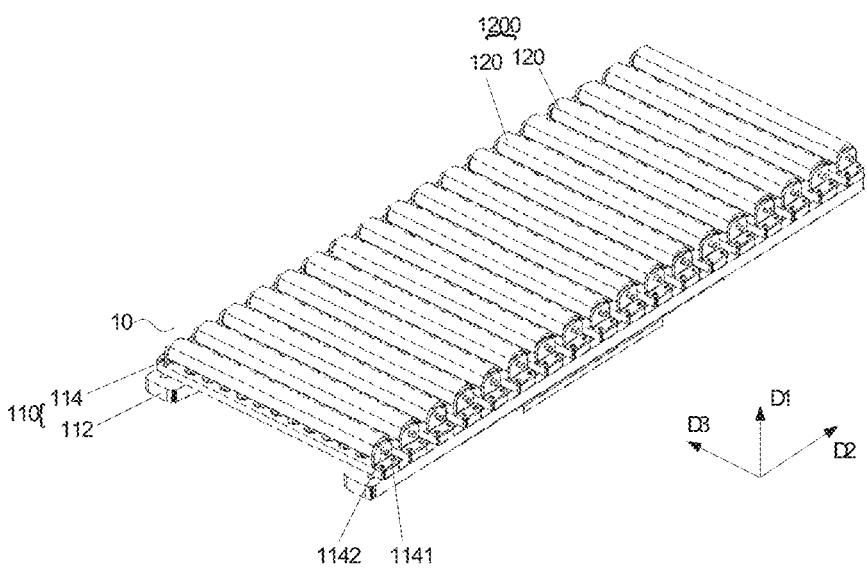
FIG. 6 schematically illustrates a perspective view of the layout of a pressurizing assembly of a first example.
Figure 7:
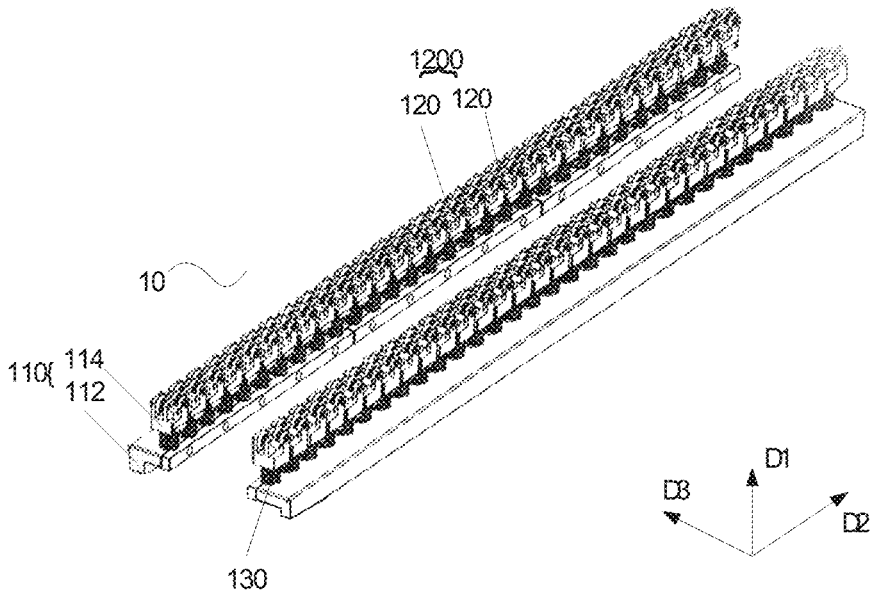
FIG. 7 schematically illustrates a perspective view of the layout of a pressurizing assembly of a second example.

The second direction D2 refers to a direction perpendicular to the first direction D1, and is the direction indicated by the arrow D2 in the drawing. Referring to FIGS. 6 and 7, a plurality of pressurizing members 120 are arranged side by side along the second direction D2 to form the pressurizing assembly 1200, and the pressurizing assembly is mounted on the mounting member 110.

In the first example shown in FIG. 6, the side-by-side arrangement of a plurality of pressurizing members 120 facilitates the formation of a plurality of longer line contact segments spaced apart on the entire surface of the battery to be flattened at least in the second direction D2.

In the second example shown in FIG. 7, the side-by-side arrangement of a plurality of pressurizing members 120 facilitates the formation of more shorter line contact segments spaced apart on the entire surface of the battery to be flattened at least in the second direction D2.

Therefore, the side-by-side arrangement of a plurality of pressurizing members 120 along the second direction D2 facilitates the formation of a plurality of line contact segments spaced apart on the entire surface of the battery to be flattened at least in the second direction D2, thereby enabling better compatibility with different degrees of protrusion of the battery surface and reducing the risk of battery damage.

According to one or more embodiments, the pressurizing mechanism 10 includes a plurality of the pressurizing assemblies 1200 arranged at intervals along a third direction D3, the third direction D3 being perpendicular to the first direction D1 and the second direction D2.

The third direction D3 refers to a direction perpendicular to the first direction D1 and the second direction D2, and is the direction indicated by the arrow D3 in the drawing.

As shown schematically in FIG. 7, a plurality of pressurizing assemblies arranged at intervals in the third direction D3 may be two pressurizing assemblies 1200, wherein each pressurizing assembly 1200 includes a plurality of pressurizing members 120 arranged side by side in the second direction D2.

The pressurizing assembly 1200 thus configured facilitates forming a plurality of line contact segments spaced apart on the entire surface to be flattened in the second direction D2, and the line contact segments are also spaced apart in the third direction D3. In this way, the more line contact segments spaced apart in both the second direction D2 and the third direction D3 can be better compatible with different degrees of protrusion of the battery surface and reduce the risk of battery damage.

According to one or more embodiments, two adjacent pressurizing members 120 in the pressurizing assembly are staggered along a third direction D3, the third direction D3 being perpendicular to the first direction D1 and the second direction D2.

The staggering of two adjacent pressurizing members 120 in the pressurizing assembly along the third direction D3 may mean that any two pressurizing members 120 are not spaced apart from each other in the third direction indicated by the arrow D3, but staggered from each other to at least partially overlap, as shown in FIG. 7.

As a result, the line contact segments formed by the abutment of the pressurizing members 120 in the pressurizing assembly against the battery are arranged more closely in the second direction D2, and are discontinuous in the third direction D3, that is, a plurality of line contact segments that are denser and staggered are formed in the third direction D3, which enables better compatibility with different degrees of protrusion on the battery surface and reduces the risk of battery damage.

According to one or more embodiments, the projections of two adjacent pressurizing members 120 along the third direction D3 are at least partially overlapped.

The projections of the two pressurizing members 120 along the third direction D3 being at least partially overlapped means that at least part of the projections formed by projecting the outer peripheral surfaces of the two pressurizing members along the third direction D3 are overlapped.

The pressurizing assembly thus constructed can form a plurality of line contact segments that are denser in the second direction D2, which enables better compatibility with different degrees of protrusion of the battery surface and reduces the risk of battery damage.

According to one or more embodiments, the mounting member 110 includes a first mounting sub-member 112 and a plurality of second mounting sub-members 114, the plurality of second mounting sub-members 114 are mounted on one side of the first mounting sub-member 112 along the first direction D1, and the pressurizing member 120 is rotatably connected to the second mounting sub-members 114.

With reference to FIGS. 6 and 7, a plurality of second mounting sub-members 114 are connected to the first mounting sub-member 112 in the first direction D1 such that the pressurizing member 120 rotatably connected to the second mounting sub-member 114 is rotatable.

The mounting member 110 thus constructed provides in a simple manner a plurality of pressurizing members 120 which can rotatably abut against the battery 400.

According to one or more embodiments, the pressurizing mechanism 10 further includes an elastic member 130, and the elastic member 130 is arranged between the first mounting sub-member 112 and the second mounting sub-member 114.

Referring to FIG. 7, the elastic member 130 is arranged between the first mounting sub-member 112 and the second mounting sub-member 114. One end of each elastic member 130 abuts against the first mounting sub-member 112 and the other end against the second mounting sub-member 114. The elastic member 130 may be a spring member. The elastic modulus of the elastic member is selected such that it can be compressed by about 3 mm during operation.

The arrangement of the elastic member 130 can make it compatible with battery surfaces with different degrees of protrusion. Taking battery terminals with height differences as an example, the elastic members 130 arranged independently of each other make each elastic member 130 adapt to the corresponding heights of the battery terminals so that they can be compressed with different compression when all the battery terminals are pressurized at the same time, so that the pressurizing pressure can be kept consistent and the flatness of the electrode terminals can be ensured.

According to one or more embodiments, the pressurizing mechanism 10 further includes a connecting rod 140, the connecting rod 140 is used to connect the first mounting sub-member 112 and the second mounting sub-member 114, and the elastic member 130 is sleeved on the connecting rod 140.

Figure 8A:
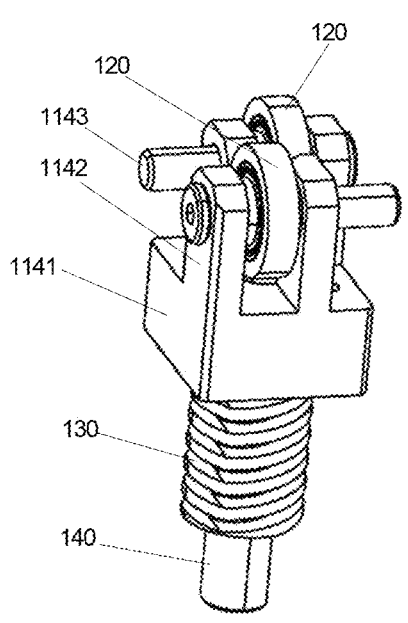
FIGS. 8A and 8B schematically illustrate assembled and exploded perspective views of the pressurizing assembly of the second example.
Figure 8B:
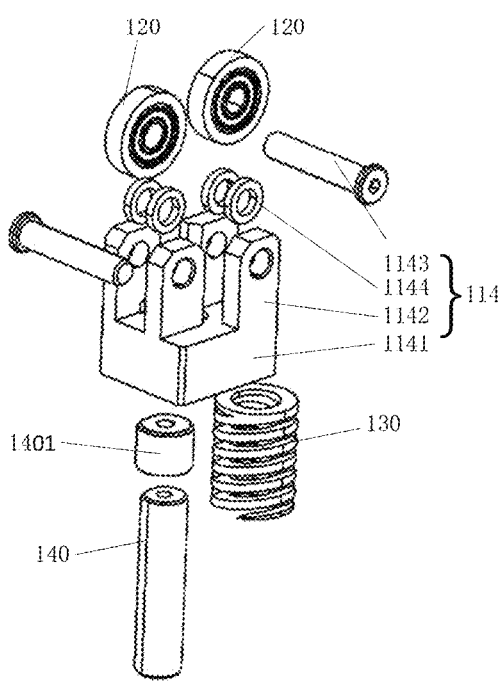

Referring to FIGS. 7 and 8A-8B, the connecting rod 140 may connect the first mounting sub-member 112 and the second mounting sub-member 124 together. The connection may be a threaded connection. Optionally, the connecting rod 140 may also be sleeved with a slidable sleeve 1401.

In this way, separate elastic members are provided in a simple manner, so that the pressurizing members 120 are independently compatible with battery surfaces with different degrees of protrusion, for example adaptable to battery terminals with different heights.

According to one or more embodiments, the second mounting sub-member 114 is connected with a plurality of pressurizing members 120.

Referring to FIGS. 7 and 8A-8B, each second mounting sub-member 114 may be connected with two pressurizing members 120. The second mounting sub-member 114 may also be connected with more than two pressurizing members 120 as required.

The connection of the plurality of pressurizing members with the second mounting sub-member 114 makes it possible to provide closer and shortened line contact segments in the second direction D2 and the third direction D3 in a simple manner.

According to one or more embodiments, the second mounting sub-member 114 includes a main body 1141 and at least a pair of lugs 1142 extending from the main body in the first direction D1. Each pair of lugs are spaced apart and arranged in parallel along the second direction D2, so that each pressurizing member 120 is rotatably mounted in each pair of lugs by means of a pivot member 1143.

The pivoting member 1143 refers to a member capable of rotating the pressurizing member 120 around it, for example, a rod-shaped member that may be a pin. The lug 1142 refers to a member protruding from the main body 1141 in the first direction D1, which is provided with a mounting hole for attachment.

Referring to FIG. 6, a pair of lugs 1142 extend from the main body 1141, each pair of lugs are arranged parallel to the second direction D2 and spaced apart from each other, so that each pressurizing member 120 is rotatably mounted into the pair of lugs. The two ends of the pressurizing member 120 shown in FIG. 6 are provided with rotating portions which can rotate in the mounting holes of the pair of lugs 1142.

Referring to FIGS. 7 to 8B, two pairs of lugs 1142 extend from the main body 1141, and each pair of lugs are arranged in parallel along the second direction D2 and spaced apart from each other, so that each pressurizing member 120 can be rotatably mounted in a corresponding pair of lugs 1142 by means of a pivot member 1143. Optionally, a pair of washers 119 may be oppositely arranged on either side of the pressurizing member 120. The arrangement of the washer can reduce wear on the pressurizing member 120. The two pairs of lugs are staggered along the second direction D2 and the third direction D3, so that the two pressurizing members 120 can provide closer and shortened line contact segments in both the second direction D2 and the third direction D3.

The second mounting sub-member thus constructed enables the plurality of pressurizing members to provide more line contact segments that are closer and shortened in length in the second direction D2 and the third direction D3, which enables better compatibility with different degrees of protrusion of the battery surface and reduces the risk of battery damage.

According to one or more embodiments, the spacing between the plurality of pressurizing assemblies 1200 in the third direction D3 is adjustable through a spacing-changing mechanism 40 connected to the first mounting member 112.

Figure 9:
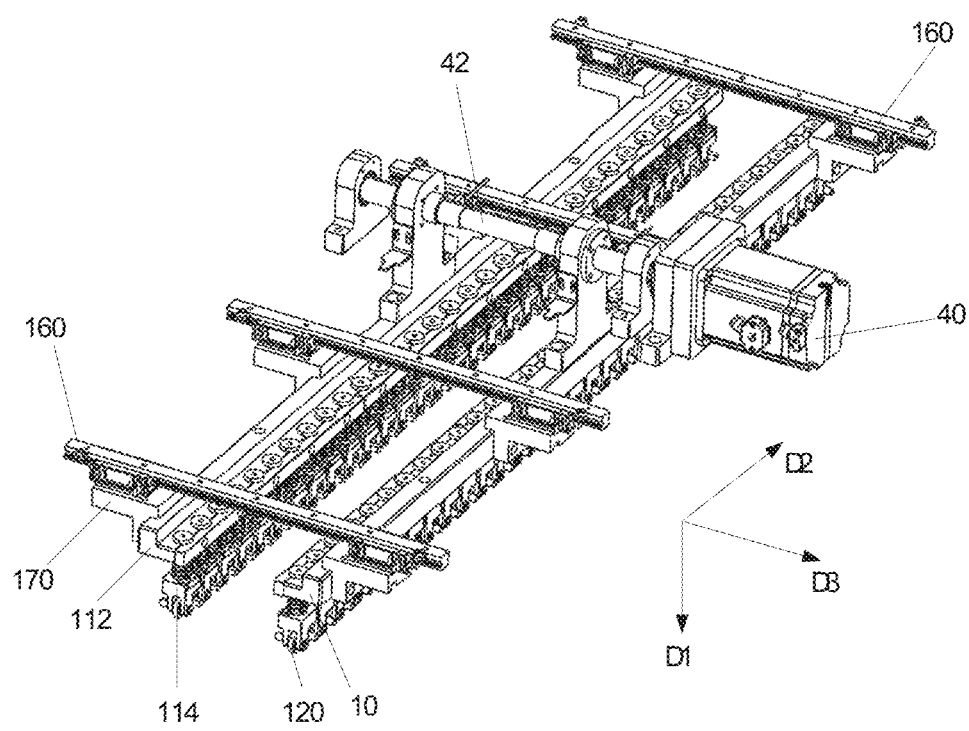
FIG. 9 schematically illustrates a perspective view of the battery pressurizing device shown in FIG. 1 with some structures removed.

Referring to FIG. 9, the spacing-changing mechanism 40 is connected to two first mounting members 112 and can adjust the spacing between the two pressurizing assemblies 1200 in the third direction D3. The spacing-changing mechanism 40 may be a servo spacing-changing mechanism.

The arrangement of the spacing-changing mechanism 40 makes the spacing of the plurality of pressurizing assemblies 1200 flexible and adjustable in the third direction D3, so as to be compatible with batteries of different widths and realize quick replacement.

According to one or more embodiments, the spacing-changing mechanism 40 includes a bidirectional adjusting screw 42.

Referring to FIG. 9, the bidirectional adjusting screw 42 of the spacing-changing mechanism can adjust the spacing by moving at least one of the two first mounting members 112. The bidirectional adjusting screw 42 is a member capable of converting the rotational motion provided by the spacing-changing mechanism into linear motion. The linear movement of the bidirectional adjusting screw 42 drives the linear movement of at least one of the two first mounting members 112 relative to each other, for example, linear movement away from or close to each other.

The arrangement of the bidirectional adjusting screw 42 provides linear movement of at least one of the plurality of first mounting members 112 relative to each other, thereby facilitating the adjustment of the spacing of the plurality of pressurizing assemblies 1200 in the third direction D3.

According to one or more embodiments, the battery pressurizing device further includes a fixing member 160, the plurality of first mounting sub-members 112 are slidably connected to the fixing member 160 along the third direction D3, and the third direction D3 is perpendicular to the first direction D1 and the second direction D2.

Figure 4:
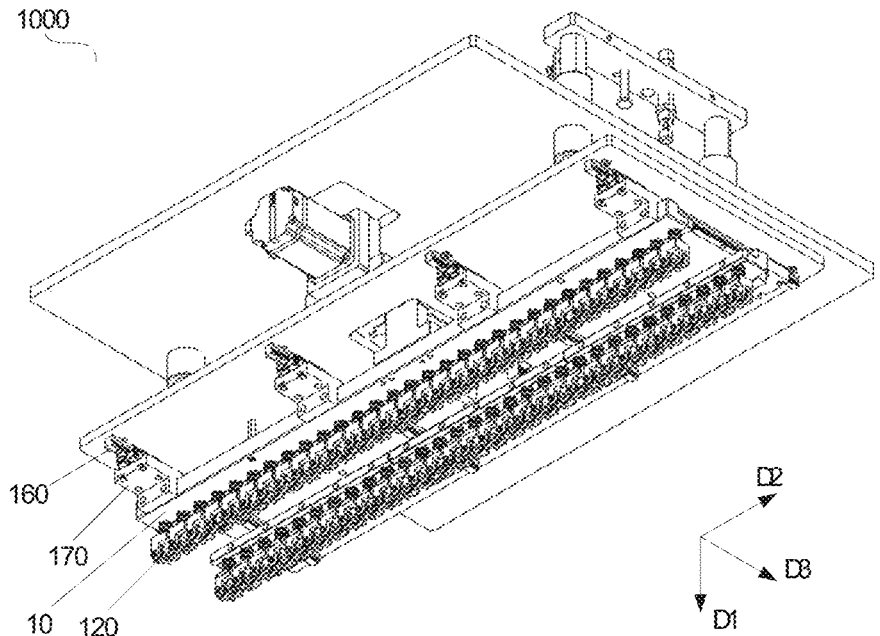
FIG. 4 schematically illustrates a bottom perspective view of the battery pressurizing device shown in FIG. 1.
Figure 5A:
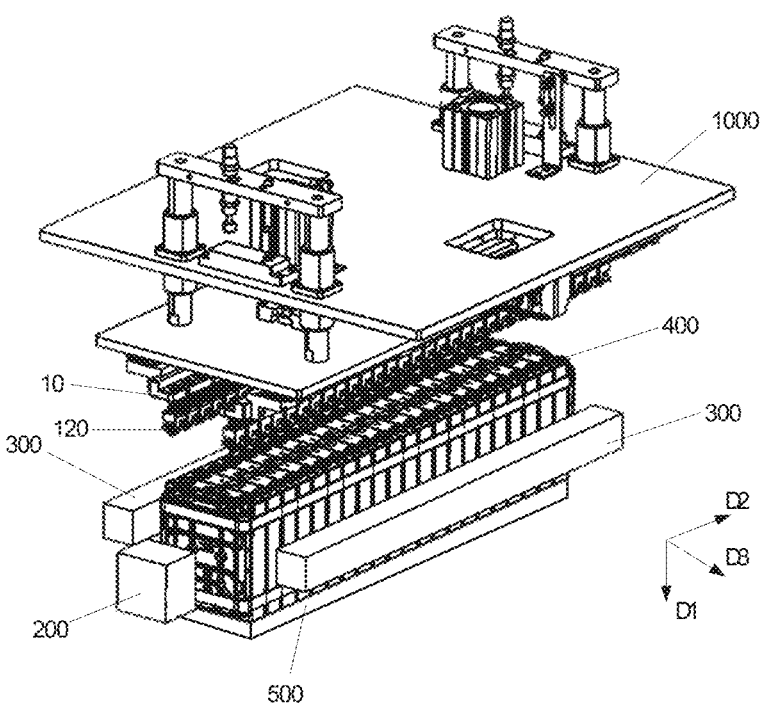
FIG. 5A schematically illustrates a perspective view of the battery pressurizing device shown in FIG. 1 in a rest position during operation.
Figure 5B:
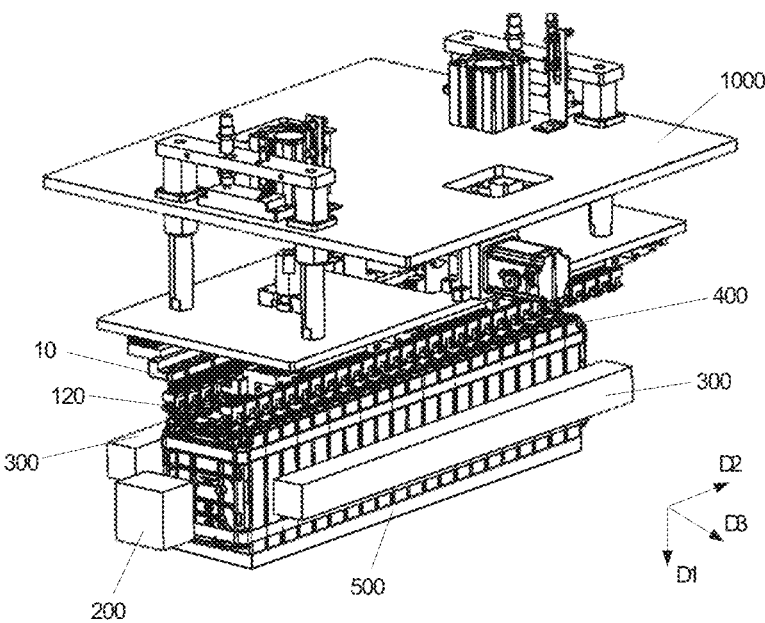
FIG. 5B schematically illustrates a perspective view of the battery pressurizing device shown in FIG. 1 in an abutting pressurizing position during operation.

Referring to FIGS. 4 and 9, the fixing member 160 may be in the form of a sliding rail. The fixing member 160 may include at least two sliding rails spaced apart along the second direction D2, and the first mounting sub-member 112 may be connected to the sliding rail by means of a sliding block 170. FIG. 9 shows four sliding rails, but the number of sliding rails is not limited thereto. The spacing between adjacent sliding rails can be 250-300 mm to provide sufficient support and smooth sliding.

The slidable connection between the fixing member 160 and the first mounting sub-member 112 along the third direction D3 facilitates providing sufficient support and smooth sliding, and facilitates the spacing-changing mechanism to more smoothly adjust the spacing between a plurality of pressurizing assemblies 1200 in the third direction D3.

According to one or more embodiments, the battery pressurizing device further includes a driving mechanism 30 and a position-limiting member 80, the driving mechanism 30 is used to drive the pressurizing mechanism 10 to move along the first direction D1, and the position-limiting member 80 is used to limit the stroke of the driving mechanism 30.

Referring to FIGS. 1 to 5B, the battery pressurizing device includes a driving mechanism 30. The driving mechanism 30 is used to drive the pressurizing mechanism 10 to move between a rest position and an abutting pressurizing position in the process of pressurizing the battery 400. In the rest position (see FIG. 5A), the pressurizing member 120 is spaced apart from the battery 400, and in the abutting pressurizing position (see FIG. 5B), the pressurizing member 120 abuts against and pressurizes the battery 400. The position-limiting member 80 is configured to limit the stroke of the driving mechanism 30.

In the example shown in FIG. 1, the driving mechanism 30 includes a fixed first driving member 32 and a movable second driving member 34. The first driving member 32 is mounted on a fixed mounting member 50, and the second driving member 34 is fixed to a movable mounting member 70. The battery pressurizing device may further include a pair of guide assemblies oppositely arranged along the second direction D2. Each guide assembly includes: two parallel guide members and a top member 82 connecting the two guide members. The two guide members are fixed on the upper surface of the movable mounting member 70 and slide through an upper guide sleeve fixed on the upper surface of the fixed mounting member 50 and a lower guide sleeve fixed on the lower surface of the fixed mounting member 50 to provide guidance.

The position-limiting member 80 is connected to the top member 82 and its extension in the first direction D1 with respect to the top member 82 is adjustable such that the distance of the position-limiting member 80 with respect to the reference plane corresponds to the stroke of the driving mechanism 30. The reference plane can be selected as the upper surface of the fixed mounting member 50. Optionally, the reference plane can be selected as the upper surface of a reference block 88 mounted on the upper surface of the fixed mounting member 50. The position-limiting member 80 can follow the guide assembly to move along the first direction D1 as driven by the driving mechanism 30.

In practice, predetermined pressure values to be applied to battery 400 are different for different types of batteries. Based on the predetermined pressure value of the battery and according to the elastic modulus and compression of the elastic member 130 and other relevant parameters, the desired stroke of the driving mechanism 30 can be obtained by conversion. Then, the distance of the position-limiting member 80 relative to the reference plane is adjusted to correspond to the stroke of the driving mechanism 30. As a result, when the position-limiting member reaches the reference plane, the driving mechanism 30 reaches the stroke and stops driving, so that a predetermined amount of pressure can be applied to the battery.

The predetermined amount of pressure of the battery refers to the predetermined pressure to be applied to the battery 400 for different types of batteries. The position-limiting member 80 limits the stroke of the driving mechanism 30 so that the pressurizing mechanism 10 provides a predetermined amount of pressure for different types of batteries 400.

According to one or more embodiments, the battery pressurizing device further includes a sensor 36, and the sensor is used to detect whether the driving mechanism 30 reaches the stroke.

Figure 2:
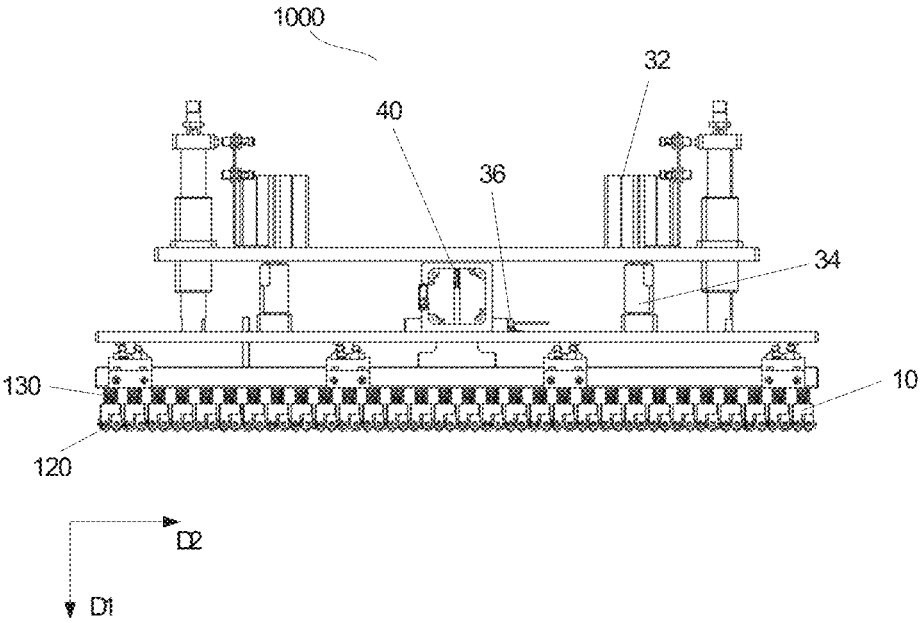
FIG. 2 schematically illustrates a front view of the battery pressurizing device shown in FIG. 1.
Figure 3:
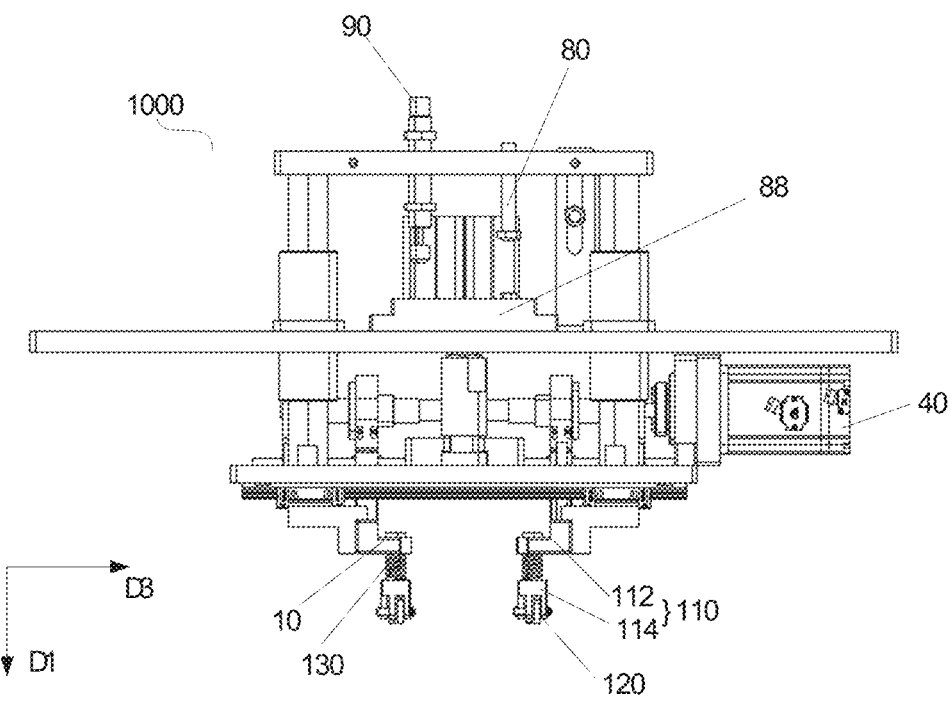
FIG. 3 schematically illustrates a side view of the battery pressurizing device shown in FIG. 1.

Referring to FIG. 2, the sensor 36 may be a position sensor mounted on the upper surface of the movable mounting member 70 for detecting whether the driving mechanism 30 reaches the stroke. Once the sensor 36 detects that the driving mechanism 30 reaches its stroke, the driving mechanism stops driving.

The sensor 36 monitors the stroke of the driving mechanism in real time to ensure that the driving of the driving mechanism is stopped once the driving mechanism reaches the stroke, so that the battery can obtain the desired predetermined amount of pressure.

In one or more embodiments, the battery pressurizing device further includes a motion buffer 90, and the motion buffer 90 is used to buffer the movement of the position-limiting member 80 when the driving mechanism 30 reaches the stroke.

In the examples shown in FIGS. 1 to 4, the battery pressurizing device further includes a motion buffer 90, and the motion buffer 90 is mounted on the top member 82 and arranged adjacent to the position-limiting member 80. The motion buffer 90 extends in the first direction D1 with respect to the top member 82. The motion buffer 90 may include a buffer portion. When the driving mechanism reaches the stroke, the buffer portion of the motion buffer 90 abuts against the reference block 88 mounted on the upper surface of the fixed mounting member 50 to buffer the motion of the position-limiting member 80 along the first direction D1. The reference block 88 may have motion-buffering properties, such as elasticity. The reference block 88 mounted on the upper surface of the fixed mounting member 50 provides a reference plane for the position-limiting member 80 on the one hand, and provides a buffer member for the motion buffer 90 on the other hand. When the reference block 88 fails, it can be easily replaced with a new reference block.

The motion buffer 90 buffers the movement of the position-limiting member 80 along the first direction D1, so as to buffer the motion of the pressurizing member 10 driven by the driving mechanism 30 to prevent the impact caused by the motion from damaging the surface of the battery.

In one or more embodiments, the battery pressurizing device further includes a shaping mechanism, the shaping mechanism is used to apply pressure to the battery 400, and the direction in which the shaping mechanism pressurizes the battery is perpendicular to the first direction D1.

Referring to FIGS. 5A and 5B, the shaping mechanism may include a first shaping mechanism 200 and a second shaping mechanism 300. The first shaping mechanism 200 may apply pressure to the battery 400 in the second direction D2. The second shaping mechanism 300 may apply pressure to the battery 400 in the third direction D3. The first shaping mechanism 200 and/or the second shaping mechanism 300 may apply pressure to the battery 400 in combination with the pressurizing mechanism 10.

Thus, the battery pressurizing device can pressurize the battery in at least two directions, so as to obtain a flat and effectively compressed battery.

According to some embodiments of the present application, the battery pressurizing device includes: a carrying mechanism 500 for carrying a battery 400; and a pressurizing mechanism 10 movable relative to the carrying mechanism 500. The pressurizing mechanism includes a mounting member 110 and a pressurizing member 120. The pressurizing member is arranged on the mounting member 110 and is rotatable relative to the mounting member. The pressurizing member 120 is used to abut against the battery 400 along a first direction D1 to apply pressure on the battery. A plurality of pressurizing members 120 arranged side by side in a second direction D2 constitute a pressurizing assembly 1200. The mounting member 110 includes a first mounting sub-member 112 and a plurality of second mounting sub-members 114. An elastic member 130 is arranged between the first mounting sub-member 112 and the second mounting sub-member 114. The battery pressurizing device may further include: a spacing-changing mechanism 40 for adjusting the spacing of the plurality of pressurizing assemblies 1200 in the third direction D3; a fixing member 160 for providing support and sliding for the pressurizing mechanism 10; a driving mechanism 30 used to drive the pressurizing mechanism 10 to move along the first direction D1; a position-limiting member 80 used to limit the stroke of the driving mechanism 30; a sensor 36 used to monitor the stroke of the driving mechanism 30 in real time; and a motion buffer 90 used for buffering the movement of the position-limiting member 80 along the first direction D1.

When the battery is pressurized using the battery pressurizing device 1000, the stroke of the driving mechanism 30 required can be calculated according to the predetermined pressure value required for different types of batteries and according to relevant parameters such as the elastic modulus and compression of the elastic member 130, and the stroke of the driving mechanism 30 can be defined by adjusting the distance of the position-limiting member 80 in the first direction D1 relative to the reference plane provided by the reference block 88. The pressurizing mechanism 10 is driven by the driving mechanism 30 to move along the first direction D1, so that the pressurizing member 120 can abut against the battery 400 and apply pressure thereto. When the sensor 36 detects that the driving mechanism 30 reaches its stroke, the position-limiting member 80 reaches the reference plane 88, and the driving mechanism 30 stops driving. At this time, the pressurizing member 120 of the pressurizing mechanism 10 applies a predetermined amount of pressure on the battery 400. The motion buffer 90 buffers the movement of the position-limiting member 80 along the first direction D1, so as to prevent the impact caused by the motion from damaging the surface of the battery. The elastic member 130 automatically adjusts its telescoping amount to accommodate different projections on the surface of the battery, so that the pressurizing pressure is kept consistent while pressurizing the entire surface of the battery, and the battery is ensured to be flat without being damaged.

In order to be compatible with modules of different widths and to achieve rapid replacement, the spacing of the plurality of pressurizing assemblies 1200 in the third direction D3 can be adjusted by using the spacing-changing mechanism 40. The battery 400 can also be pressurized in at least one other direction while being pressurized by the pressurizing mechanism 10 or thereafter to obtain a flat and effectively compressed battery.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A battery pressurizing device, comprising:
   a carrying structure for carrying a battery;
   a pressurizing structure movable relative to the carrying structure,
   wherein the pressurizing structure includes a mounting structure and a pressurizing rotator, the pressurizing rotator is arranged on the mounting structure and is rotatable relative to the mounting structure, and the pressurizing rotator is configured to abut against the battery along a first direction to apply pressure on the battery,
   the pressurizing structure includes a plurality of pressurizing assemblies, each of the pressurizing assemblies includes a plurality of pressurizing rotators arranged side by side along a second direction, each of the pressurizing assemblies is mounted on the mounting structure, and the second direction is perpendicular to the first direction,
   each of the pressurizing assemblies arranged at intervals and spaced from one another along a third direction, and the third direction is perpendicular to the first direction and the second direction, and
   two adjacent pressurizing rotators of the plurality of pressurizing rotators in each of the pressurizing assemblies are staggered along the third direction.

2. The battery pressurizing device according to claim 1, wherein the pressurizing rotator includes at least one roller, and a rotation plane of the roller is parallel to the abutting direction of the pressurizing rotator abutting against the battery.

3. The battery pressurizing device according to claim 2, wherein the outer peripheral surface of the roller is at least partially arc-shaped.

4. The battery pressurizing device according to claim 1, wherein a surface of the pressurizing rotator is made of an elastic insulating material.

5. The battery pressurizing device according to claim 1, wherein projections of two adjacent pressurizing rotators along the third direction are at least partially overlapped.

6. The battery pressurizing device according to claim 1, wherein the mounting structure includes a first mounting sub-structure and a plurality of second mounting sub-structures, the plurality of second mounting sub-structures are mounted on one side of the first mounting sub-structure along the first direction, and the pressurizing rotator is rotatably connected to the second mounting sub-structures.

7. The battery pressurizing device according to claim 6, wherein the pressurizing structure further includes an elastic structure, and the elastic structure is arranged between the first mounting sub-structure and the second mounting sub-structure.

8. The battery pressurizing device according to claim 7, wherein the pressurizing structure-further includes a connecting rod, the connecting rod is used to connect the first mounting sub-structure and the second mounting sub-structure, and the elastic structure is sleeved on the connecting rod.

9. The battery pressurizing device according to claim 6, wherein the second mounting sub-structure is connected with the plurality of pressurizing rotators.

10. The battery pressurizing device according to claim 6, wherein the second mounting sub-structure includes a main body and at least a pair of lugs extending from the main body in the first direction, each pair of lugs are spaced apart and arranged in parallel in the second direction, so that each pressurizing rotator is rotatably mounted in each pair of lugs by means of a pivot structure.

11. The battery pressurizing device according to claim 1, wherein a spacing between the plurality of pressurizing assemblies in the third direction is adjustable through a spacing-changing structure connected to the mounting structure.

12. The battery pressurizing device according to claim 11, wherein the spacing-changing structure includes a bidirectional adjusting screw.

13. The battery pressurizing device according to claim 11, wherein the battery pressurizing device further includes a fixing structure, a plurality of first mounting sub-structures are slidably connected to the fixing structure along the third direction, and the third direction is perpendicular to the first direction and the second direction.

14. The battery pressurizing device according to claim 1, wherein the battery pressurizing device further includes a driving structure and a position-limiting structure, the driving structure is configured to drive the pressurizing structure to move along the first direction, and the position-limiting structure is configured to limit the stroke of the driving structure.

15. The battery pressurizing device according to claim 14, wherein the battery pressurizing device further includes a sensor to detect whether the driving structure reaches the stroke.

16. The battery pressurizing device according to claim 14, wherein the battery pressurizing device further includes a motion buffer to buffer the movement of the position-limiting structure when the driving structure reaches the stroke.

17. The battery pressurizing device according to claim 1, wherein the battery pressurizing device further includes a shaping structure to apply pressure to the battery, a direction in which the shaping structure pressurizes the battery being perpendicular to the first direction.

* * * * *